(No Model.)

A. ARNOLD.
MOLE TRAP.

No. 528,136.  Patented Oct. 30, 1894.

Witnesses
Wm H Doyle
J. B. Owens

Inventor
Alvin Arnold
By his Attorneys
C. A. Snow & Co.

UNITED STATES PATENT OFFICE.

ALVIN ARNOLD, OF BURKET, INDIANA.

MOLE-TRAP.

SPECIFICATION forming part of Letters Patent No. 528,136, dated October 30, 1894.

Application filed June 5, 1894. Serial No. 513,546. (No model.)

*To all whom it may concern:*

Be it known that I, ALVIN ARNOLD, a citizen of the United States, residing at Burket, in the county of Kosciusko and State of Indiana, have invented a new and useful Mole-Trap, of which the following is a specification.

The invention relates to that class of mole traps wherein a swinging section is provided and adapted to descend upon the victim as he engages a trip or trigger by which the swinging section is supported, the said section being provided with spurs designed to pierce the victim and thereby exterminate him; and the invention consists in certain peculiar features of construction whereby the trap is made more sensitive and efficient, and whereby its positive operation is insured.

Figure 1:
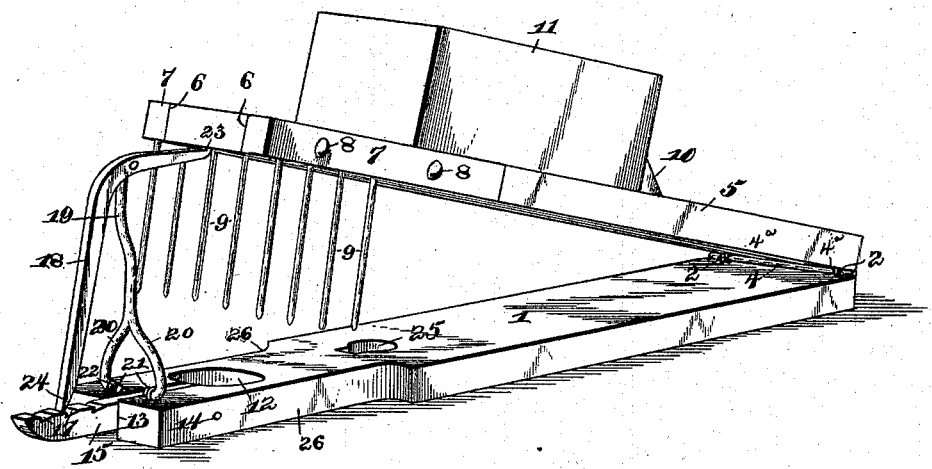
Figure 2:
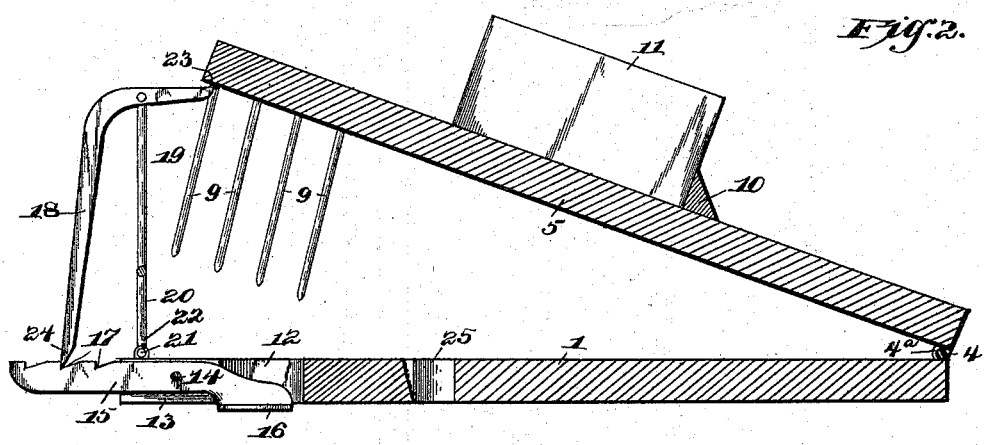
Figure 3:
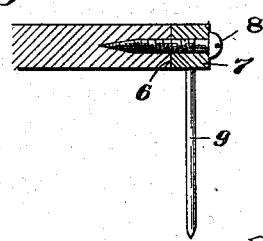
Figure 4:
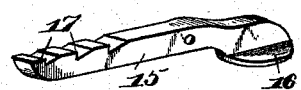

In the accompanying drawings: Figure 1 represents a perspective view of my improvements, showing them in the position which they assume when practically operating. Fig. 2 is a longitudinal section of the same. Fig. 3 is a detail sectional view, illustrative of the means for securing the spurs or teeth in place. Fig. 4 is a detail perspective of the trip-lever, whereby the trip for supporting the swinging section is actuated.

The frame portion of the trap consists of a horizontal board 1, provided at one end with the staples or eyes 2, adapted to receive the transverse bar 4, which is, in turn, loosely mounted in the eyes 4ª of the swinging section 5. By these means the swinging section 5 is pivotally connected to the main board 1. The board 1 is adapted to lie horizontally on the ground and with the section 5 above it. Formed in the front sides of the section 5 are the recesses 6, which are one for each side and which are adapted for the reception of the blocks 7 respectively. The blocks are secured in their places by means of the screws 8, which are preferably two for each block and which operate to rigidly fix the blocks.

Secured to and projecting from the lower side of the blocks 7 are the spurs 9, which are preferably four for each block and consequently eight in number. These spurs are of a length slightly less than the distance from the level of the ground to the normal position of the section 5, and have their lower ends pointed so that they will effectually pierce the victim with which they engage. The purpose of securing the spurs 9 to the section 5, through the medium of the blocks 7, is to permit their removal when it is desired to pack the trap for shipping, thereby facilitating a considerable decrease in the size of the trap. This construction is not, however, absolutely essential to my invention.

Rigidly secured to the upper side of the section 5, and near the lower end thereof, is the cleat 10, which is provided with a vertical face on its forward side and which is adapted to retain the weights 11. These devices, weights 11, are mounted upon the upper side of the section 5, to give said section an extra downward tendency, so that the effective operation of the spurs 9 is insured. Formed in the front end of the main board 1 is the opening 12, which is located in from the edges of the board and is provided with the slot 13, extending to the front edge thereof. Fulcrumed to the pin 14, arranged transversely in the board 1, and passing through the slot 13 at about its middle, is the lever 15, which has one end projecting into the opening 12, while the remaining end extends forward of the front edge of the board 1. Fixed to the under side of the lever 15, and to that arm which is arranged within the opening 12, is the circular plate 16, which is of a size slightly less than that of the opening 12, and which has for its purpose to furnish a surface against which the victim of the trap may bear, as will be more fully described hereinafter. The remaining end of the lever 15, that which is extended beyond the front end of the board 1, is formed with the notches 17 in its upper side. These notches are, by preference, three in number, though this may obviously be varied, and are adapted to operate with the lower end of the bent lever 18. The lever 18 is the trip-lever of the trap, and consists of a metallic bar provided with a normally vertical long arm having the short arm extending horizontally and rearwardly from its upper end. Fulcrumed to the lever 18, at a point near the meeting of the two arms, is the supporting rod 19, which proceeds downwardly from the lever 18 and which has its lower end bifurcated to form the arms 20, which are provided with the inwardly-extending trunnions 21, adapted to be rockably mounted in the staples 22.

The staples 22 are, in turn, rigidly secured to the upper side of the board 1, and at the front end thereof. Thus it will be seen that the lever 18, is given a pivotal bearing, and that it is capable of swinging on its fulcrum at the upper end of the rod 19, and of swinging with the upper end of said rod, and on the bearings of the trunnions 21 and staples 22. The extreme rear end of the short arm of the lever 18 is provided with an upwardly-extending stud or spur 23, which is adapted to engage with the lower front side of the swinging section 5, and by such engagement to support the same. The lower end of the long arm of the lever 18 is provided with a point 24, adapted to operate with one of the notches 17 of the lever 15, and by such means to give the lever 18 a firm seat. By these devices it will be possible to mount the lever 18 in a rigid upright position; such a position as will support the section 5 under the weight of its inherent gravity and of the gravity of weights 11.

Formed in the board 1, at a point just to the rear of the opening 12, is the circular opening 25, which is longitudinally aligned with the opening 12, and which has for its purpose to receive the short arm of the lever 18 when said lever is swung with the rod 19 so as to lie horizontally and snugly against the upper side of the board 1. The purpose of this arrangement is to permit packing the trap for transportation.

In the use of my invention, the board 1 is arranged on the surface of the ground, and with the opening 12 directly over the mole hill, so that the mole in passing therethrough will pass under said opening. The section 5 should now be raised so that the short arm of lever 18 may be passed under it, and the spur thereof engaged with the under side of the section. When this has been done, the long arm of the lever 18 should be engaged with one of the notches 17 of the lever 15, and the weights 11 placed upon the upper side of section 5, as explained. The setting of the trap is now complete, and, as the mole passes through the hill, he will engage with the plate 16 and raise the same, whereupon the front arm of lever 15 will be moved downwardly, thus disengaging said lever and the lever 18, and making it possible for the weight on the section 5 to swing the lever 18 on its fulcrum, and thereby destroying the support of the section 5. When this operation has taken place, the weight of the section 5 and its attachments will cause the section to drop and to force its spurs 9 into the mole hill on either side of the board 1. As the spurs 9 enter the mole hill they will necessarily pierce the mole, since he must be directly under the board 1 before he can release the lever 15. The front sides of the board 1 are formed with the notches 26 therein, and these notches correspond in size and shape to the notches 6 of the section 5, so as to form a space through which the spurs 9 may pass when performing the aforegoing operation.

It will be understood that the staples 2 and 4ª may be substituted by any form of hinge, since they are only one of many ways in which the two sections may be joined.

Having described my invention, what I claim is—

1. In a mole trap, the combination of a stationary base-board bifurcated at one end and adapted to lie upon the surface of the ground and over the mole hill, a lever fulcrumed in the base-board and adapted to be engaged by the mole when passing through the hill, a rod having a fork at its lower end and straddling the bifurcation in the base-board and pivoted thereto, a second lever fulcrumed to the upper end of the rod and removably connected with the first lever, and a weighted spur-carrying section pivoted to the base-board and adapted to engage the remaining end of the second lever whereby the spur-carrying section is supported, and whereby, upon the operation of the first lever, the support of said section may be destroyed and the section be allowed to fall upon the mole hill, substantially as described.

2. In a mole trap, the combination of a base-board provided with a bifurcated end and with an opening in its interior, a movable board pivoted to the base-board, spurs on said movable board and depending downwardly therefrom, a lever fulcrumed within the bifurcation of the base-board and having one of its arms notched on the upper side, a rod pivoted to the base-board over the lever, and a second lever fulcrumed to the upper end of the rod and bent to form a horizontal and vertical arm, the horizontal arm being capable of engaging the movable board and of folding into the opening in the interior of the base-board, while the vertical arm is normally seated in the notched portion of the first lever, substantially as described.

In testimony that I claim the foregoing as my own I have hereto affixed my signature in the presence of two witnesses.

ALVIN ARNOLD.

Witnesses:
GEORGE W. HASTINGS,
CHARLOTTE GASKILL.